Patented Aug. 2, 1927.

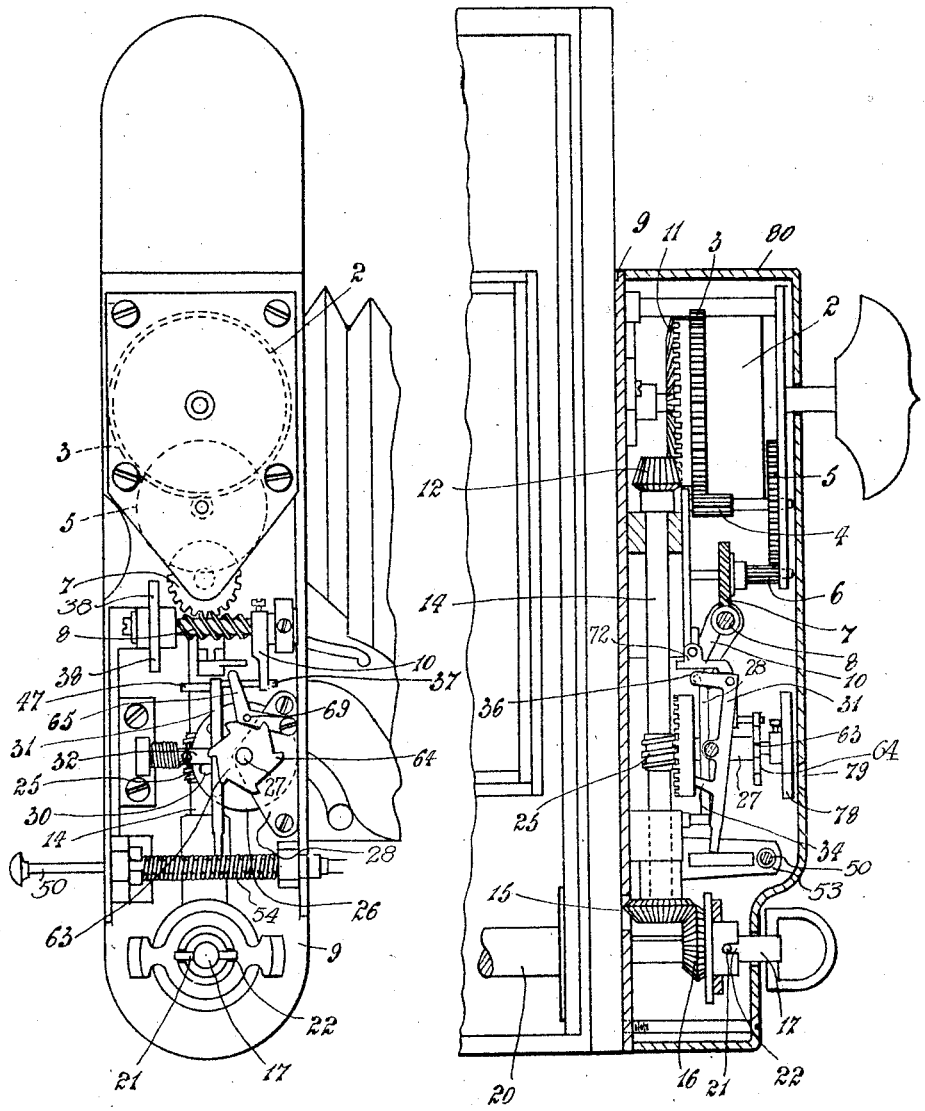

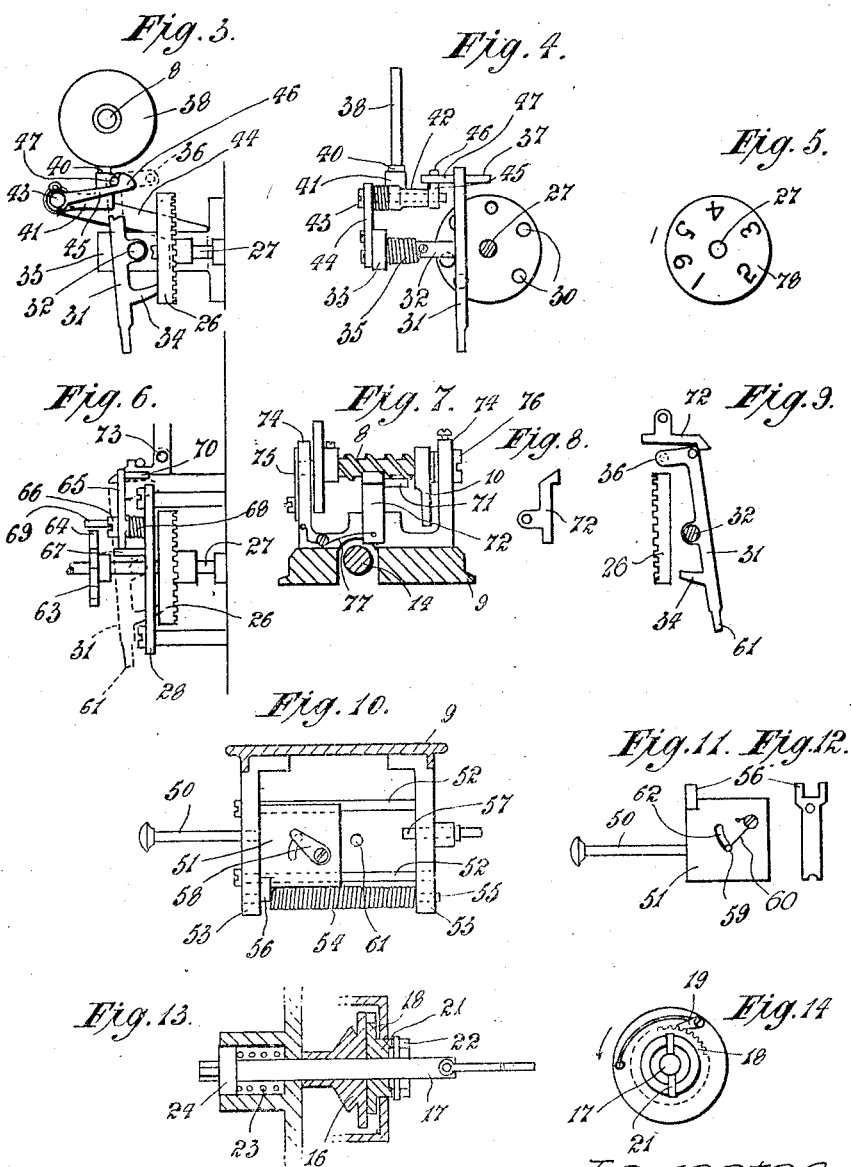

1,637,414

UNITED STATES PATENT OFFICE.

FREDERICK HOWE HADFIELD, OF AUCKLAND, NEW ZEALAND.

AUTOMATIC ROLL-FILM CAMERA.

Application filed January 19, 1926, Serial No. 82,350, and in New Zealand July 24, 1925.

This invention relates to roll film cameras of the type wherein the film is automatically wound up by spring driven mechanism which is released by the shutter operating upon the return movement thereof.

In apparatus of this character, it has been suggested previously to employ a spring actuated member such member being operatively connected to a stop normally contacting with the fly of the clock-work and being provided with a roller which is adapted to pass through any one of a series of suitably disposed holes or notches in the film, so as to be normally in engagement therethrough, while a variety of means have been suggested to release the film and simultaneously start the spring drum mechanism. All these devices have the objection that special films must be manufactured for the use of such cameras.

The chief object of the present invention is to provide the automatic camera in which the usual films may be employed and which will automatically wind the required amount for each exposure.

In all such cameras, the relative diameters of the top and bottom spools change as the film is unrolled, the top spool diameters becoming less and the lower spool diameter greater. Hence methods must be adopted to equalize this movement so that the exact distance required for an exposure is automatically unrolled at each advance.

Thus, first:—the movement must be started. Second, the speed governed. Third, the exact distance or length of film to be unrolled, determined. Fourth, the movement stopped definitely and without undue shock to the mechanism. Fifth, the wheelwork arranged so that after the full number of exposures are made, the position will be such that a new film can be correctly inserted to start again.

The drawings illustrate an improved form of the invention applicable to a camera using a film of six exposures, and on the drawings Figure 1, is a side elevation of the mechanism.

Figure 2, is an end elevation thereof, partly in section.

Figure 3, is an end elevation of the brake mechanism, the view being obverse to that of Figure 2.

Figure 4, is a side elevation thereof.

Figure 5, is a side view of the indicator wheel.

Figure 6, is an end elevation of disengagement mechanism viewed from the same direction as Figure 3.

Figure 7, is an inverted plan thereof.

Figure 8, is a view of the disengagement detent.

Figure 9, is a view of the swinging lever.

Figure 10, is a plan of the release mechanism.

Figure 11, is an inverted plan of a slider used with the release mechanism.

Figure 12, is an end view thereof.

Figure 13, is a section of the clutch mechanism.

Figure 14, is an end view thereof.

Referring chiefly to Figures 1 and 2, a main spring is contained in a barrel 2 and drives by means of spur gears 3, 4, 5, 6, and 7, a worm spindle 8 which carries a revolving stop detent 10. The barrel 2 and gears are mounted in suitable supports fixed to a base plate 9 which is secured to or may form a part of the camera casing. The barrel also drives by means of a bevel wheel 11 and pinion 12 a longitudinal shaft 14. This shaft 14 carries at its lower end a bevel wheel 15 gearing with another bevel wheel 16 loosely mounted on the spool clutch spindle 17 (see also Figure 13) and drives the clutch wheel 18 by a spring operated ratchet pawl 19 which operates the lower film roller 20 in one direction, the spindle 17 having a pin 21 engaging slots 22 in the boss of the wheel 18, and normally retained in engagement by a spring 23 in compression between the plate 9 and the end 24 of the spindle. The spindle may thus be drawn out of engagement with the ratchet wheel 18 when inserting or removing a spool.

The longitudinal shaft 14 carries a worm 25 gearing into a crown wheel 26 on a spindle 27 pivoted in the plate 9 and in a plate 28. The relation of this worm and the number of teeth on the crown wheel 26 is such that the required revolutions of the shaft 14 to wind the exposed film and the necessary space between each exposed portion upon the spool 20 will revolve the wheel through a complete revolution. In other words, the crown wheel makes one revolution to the number of revolutions of the spool to wind the film thereon.

The crown wheel 26 contains six unequally spaced holes 30 in its outer face (see Figures 1 and 4) while in front of the crown wheel is a swinging lever 31 mounted on a spindle 32 pivoted in a bearing 33 and provided with a tail piece 34 arranged to fall into one of the holes 30 in the crown wheel 26 and be retained therein by means of a spiral spring 35 on the spindle 32. When the tail piece 34 falls into a hole in the crown wheel the other end 36 of the swinging lever rises and a pin 37 projecting laterally therefrom engages the detent 10 and instantly stops the action of the train of wheels 3 to 7 and shaft 14. This stop mechanism comes into action each time the tail piece 34 falls into a hole 30 in the crown wheel 26. The holes are spaced apart so that the crown wheel will rotate a less distance between each stop and the shaft 14 will thus not wind the spool so much thereby compensating for the increasing diameter of the spool as the film winds thereon.

To relieve the sudden injurious shock to the mechanism by such stoppage a brake wheel 38 is arranged on the spindle 8, while a brake of felt 40 (see Figures 3 and 4) bears on the wheel 38 and is carried on an arm 41 from a boss 42 pivoted on a pin 43 projecting from a plate 44 fixed to the bearing 33. An arm 45 having a cam shaped end 46 projects from the boss 42 and engages a pin 47 projecting from the lever 31, and as the tail piece 34 falls into a hole 30 the pin 47 permits the end 46 of the arm 45 to move upward and the brake to contact with the wheel 38.

A push pin 50 is attached to a slider 51 (see Figures 10 to 12) guided on rods 52 in posts 53, such slider being retained outwards by a spiral spring 54 on a rod 55 and in compression against lips 56 on the slider 51. The slider 51 operates the usual form of "antinous release" by striking a striker 57 which operates the shutter (not shown).

The slider carries a spring controlled cam 58 having a pin 59 projecting through a slot 62 and operated by the spring 60 on the other side of the slider. This cam upon its forward movement remains inoperative and passes over the end 61 of the swinging lever.

A disengagement wheel 63 (see Figures 1, 2 and 6) containing a number of teeth 64 is mounted on the spindle 27 while a lever 65 pivoted on a pin 66 is normally held against a pin 67 by a spring 68. A pin 69 on this lever is adapted to be engaged by the teeth 64 of the wheel 63. The end of this lever has a pin 70 which is adapted to engage a pin 71 on a detent 72 (see also Figures 7 and 8) pivoted at 73 and held by a spring 77 (see Figure 7) and by means thereof push back the detent 72 out of engagement with the end 36 of the lever.

The spindle 8 is journalled in the posts 74 and a flat spring 75 fixed at one end to the post bears upon the end of the spindle, while the other end of the spindle is pivoted in a threaded stud 76 screwing into the other post. By adjusting the stud 76 the pressure of the spindle against the spring is regulated and thus forms a speed governor.

The shaft 27 carrying the crown wheel also carries a number wheel 78 (Figures 2 and 5) showing by numbers 1 to 6 the actual position of wheel work in relation to the position of the film through a sight hole 79 in the cover plate 80. These numbers must agree with those shown upon the film through its sight hole.

The film is inserted in the camera in the usual manner and brought down to position "1" by the clutch spindle 17. The motor must now stand also at position "1" as shown through the sight hole.

In operation, upon pressing the push-pin 50 the exposure is made and the cam 58 passes over the end of the lever and upon the return movement this cam passes upon the end 61 of the swinging lever raising it and thereby causing the tail piece 34 to come out of engagement with the hole 30 indicated by number "1" of the number wheel and causing the pin 37 of this lever to release the detent 10 and the pin 47 to move back the lever 45 and release the brake 40 from the brake wheel, thereby permitting the wheel work to revolve and thereby to rotate the shaft 14 and revolve the bottom film roller to wind the film thereon.

Immediately the end 61 of the swinging lever has been raised the detent 72 will lock the end of the swinging lever as shown in Figure 9 in order to give time for the gears to get well underway. When the movement of the gears is well underway the detent 72 will be moved out of engagement with the end 36 of the lever by the pin 70 on the end of the lever 65 engaging the pin 71 on the detent, such lever being moved forwards by a tooth 64 of the disengagement wheel 63 engaging the pin 69. The teeth 64 are spaced apart to correspond with the distance between the holes 30 on the crown wheel. The swinging lever 31 being released the coil spring 35 will push the other end of the lever downwards and the tail piece 34 will rest upon the exterior face of the crown wheel and immediately the next hole number "2" on the number wheel is opposite the tail piece such tail piece will drop therein and the pin 37 on the other end thereof will be raised so that the detent 10 will strike such pin and stop the rotation of the gears. As the tail piece drops into the hole in the crown wheel the pin 47 on the lever will move over the end 46 of the arm 45 and permit the brake 40 to contact with the periphery of the wheel 38.

This operation is repeated until the whole of the six exposures are made, and when the last is made the film is rolled down by the spindle 17 to its end as usual and the motor will stand at number "1" ready for the insertion of a new film.

The mechanism may be varied according to the application to different types of cameras, the general principle, however, being the same.

What I claim is:—

1. In a film camera, spring operated means to wind the film on a spool, a longitudinal shaft driven by said spring means, a winding spool spindle rotated in one direction by said shaft, a wheel having its axis at right angles to said shaft and driven by said longitudinal shaft, holes in the face of said wheel corresponding in number to the exposures to be made on the film and spaced so that the rotation of said shaft will at each exposure be sufficient to wind the film the correct amount for the next exposure, a lever pivoted across the face of said wheel, a portion of said lever adapted to fall into said holes, means whereby when said lever falls into one of said holes the spring operated means will be stopped, and means for releasing said lever immediately the exposure is made, substantially as described.

2. In a film camera having spring operated means to wind the film on a spool, a longitudinal shaft driven by a gear wheel from said spring means, a winding spool spindle driven by the other end of said shaft, a ratchet whereby said spindle may be driven in one direction by said longitudinal shaft, a worm on said shaft, a crown wheel driven by said worm, holes in the face of said crown wheel, a spring operated swinging lever, a tail piece on said lever adapted to engage said holes under pressure of the spring, a pin projecting laterally from the other end of said swinging lever, a revolving detent driven by clockwork gearing from the driving means adapted to strike said pin when the tail piece falls into one of said holes and stop the rotation of said shaft, and means for operating said swinging lever immediately the exposure is made, substantially as described.

3. In the apparatus as claimed in claim 2, a spring controlled detent adapted to engage the end of said swinging lever, a toothed disengagement wheel adapted to rotate with said crown wheel, a lever adapted to be operated by said disengagement wheel, a pin on said lever adapted to release said detent from the end of said swinging lever, substantially as described.

4. In the apparatus as claimed in claim 2, a slider, a spring normally to retain said slider outwards, a spring operated cam adapted on the inward movement of said slider to ride over the end of said lever, but on its return movement to raise said lever out of engagement with a hole in the crown wheel, said slider adapted on its inward movement to operate means to operate the shutter of the camera, substantially as described.

In testimony whereof, I have signed my name to this specification.

FREDERICK HOWE HADFIELD.